United States Patent
Sumi et al.

(10) Patent No.: US 12,164,065 B2
(45) Date of Patent: Dec. 10, 2024

(54) RADIATION IMAGING APPARATUS

(71) Applicant: Konica Minolta, Inc., Tokyo (JP)

(72) Inventors: Makoto Sumi, Tokorozawa (JP); Hajime Ishimoto, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 31 days.

(21) Appl. No.: 17/698,026

(22) Filed: Mar. 18, 2022

(65) Prior Publication Data

US 2022/0299659 A1    Sep. 22, 2022

(30) Foreign Application Priority Data

Mar. 18, 2021 (JP) ................................. 2021-044309

(51) Int. Cl.
*G01T 1/164* (2006.01)
*G01T 1/17* (2006.01)
*G01T 1/24* (2006.01)

(52) U.S. Cl.
CPC .............. *G01T 1/1641* (2013.01); *G01T 1/17* (2013.01); *G01T 1/244* (2013.01)

(58) Field of Classification Search
CPC .......... G01T 1/1641; G01T 1/17; G01T 1/244
See application file for complete search history.

(56) References Cited

U.S. PATENT DOCUMENTS

| | | | | |
|---|---|---|---|---|
| 2,976,445 A * | 3/1961 | Mazzagatti | ............ | H01J 47/08 250/374 |
| 3,794,836 A * | 2/1974 | Hinckfuss | ............ | G01N 23/12 378/53 |
| 3,862,418 A * | 1/1975 | Preiss | ............ | G01V 5/10 250/269.1 |
| 4,760,260 A * | 7/1988 | Walsh | ............ | G01T 1/163 250/374 |
| 4,862,005 A * | 8/1989 | Johnson | ............ | G01T 1/167 250/336.1 |
| 5,286,973 A * | 2/1994 | Westrom | ............ | G01T 7/00 250/515.1 |
| 5,305,363 A * | 4/1994 | Burke | ............ | H05G 1/60 378/10 |
| 5,517,030 A * | 5/1996 | Nabais Conde | ............ | G01T 1/205 250/361 R |
| 5,991,357 A * | 11/1999 | Marcovici | ............ | G01T 1/2985 378/149 |
| 6,433,340 B1 * | 8/2002 | Penn | ............ | G01T 1/202 250/361 R |

(Continued)

FOREIGN PATENT DOCUMENTS

| | | |
|---|---|---|
| JP | 2012073186 A | 4/2012 |
| JP | 2018000242 A | 1/2018 |

OTHER PUBLICATIONS

JPO Notice of Reasons for Refusal for corresponding JP Application No. 2021-044308; issued Sep. 10, 2024.

*Primary Examiner* — Blake C Riddick
(74) *Attorney, Agent, or Firm* — CANTOR COLBURN LLP

(57) ABSTRACT

Provided is a radiation detector that converts an intensity of received radiation into an electrical signal and a case that houses the radiation detector. An area of the case other than a predetermined area is formed of a material having durability against a disinfectant solution that has a higher disinfection effect than ethanol.

8 Claims, 3 Drawing Sheets

(56) References Cited

U.S. PATENT DOCUMENTS

| | | | | |
|---|---|---|---|---|
| 2008/0258066 A1* | 10/2008 | Chen | | H01L 31/1832 |
| | | | | 250/370.01 |
| 2010/0032577 A1* | 2/2010 | Fruehauf | | G01T 1/202 |
| | | | | 250/368 |
| 2010/0171039 A1* | 7/2010 | Wilson | | G01T 1/2006 |
| | | | | 250/361 R |
| 2010/0193693 A1* | 8/2010 | Jones | | G01T 1/20 |
| | | | | 250/367 |
| 2012/0074331 A1* | 3/2012 | Koyanagi | | G03B 42/04 |
| | | | | 250/394 |
| 2012/0132818 A1* | 5/2012 | Falke | | H01J 37/28 |
| | | | | 250/336.1 |
| 2013/0026379 A1* | 1/2013 | Lohse | | H01L 27/14618 |
| | | | | 250/370.12 |
| 2013/0026978 A1* | 1/2013 | Cooley | | H01M 10/052 |
| | | | | 307/43 |
| 2014/0117246 A1* | 5/2014 | Zhou | | G01T 3/008 |
| | | | | 250/374 |
| 2014/0226795 A1* | 8/2014 | Kitano | | A61B 6/56 |
| | | | | 378/189 |
| 2015/0276944 A1* | 10/2015 | Enomoto | | A61B 6/4233 |
| | | | | 378/101 |
| 2015/0309191 A1* | 10/2015 | Saenger | | G01T 1/2002 |
| | | | | 250/487.1 |
| 2015/0327823 A1* | 11/2015 | Nariyuki | | A61B 6/0414 |
| | | | | 378/208 |
| 2016/0047785 A1* | 2/2016 | Mann | | G01N 33/0055 |
| | | | | 73/23.2 |
| 2016/0182778 A1* | 6/2016 | Kalfas | | H04N 23/50 |
| | | | | 348/82 |
| 2017/0372572 A1* | 12/2017 | Kano | | C22C 23/00 |
| 2018/0014799 A1* | 1/2018 | Schmulenson | | A61B 6/50 |
| 2020/0103536 A1* | 4/2020 | Horiuchi | | G01T 1/208 |
| 2020/0278458 A1* | 9/2020 | Tadokoro | | G01T 1/023 |
| 2022/0236430 A1* | 7/2022 | Hatakeyama | | G01T 1/247 |
| 2023/0181145 A1* | 6/2023 | Aoki | | A61B 6/4208 |
| | | | | 250/361 R |

* cited by examiner

RADIATION IMAGING APPARATUS

CROSS-REFERENCE TO RELATED APPLICATIONS

The present invention claims priority under 35 U.S.C. § 119 to Japanese Patent Application No. 2021-044309 filed on Mar. 18, 2021, the entire contents of which being incorporated herein by reference.

BACKGROUND

Technological Field

The present invention relates to a radiation imaging apparatus.

Description of the Related Art

In the technical field of portable radiation imaging apparatuses, at least part of the casing is formed of metal such as a magnesium alloy, as shown in JP2012-073186A, for example, in view of improving the robustness and reducing the weight.

A portable radiation imaging apparatus often comes into contact with examinees during imaging. In imaging using a radiographic imaging apparatus, therefore, the surface of the casing is wiped for disinfection with a disinfectant solution such as ethanol for disinfection.

SUMMARY

In recent years, a disinfectant solution with a higher disinfection effect compared to ethanol for disinfection (ex., sodium hypochlorite) has been used because of enhanced infection control measures.

However, such disinfectant solutions may have a property of corroding metals. Therefore, in a radiation imaging apparatus that contains metal in the casing, the casing may corrode by being wiped.

The corrosion of the casing may break continuity between the casing and the radiation detector inside (making it impossible to release a noise), and lead to degrading the image quality of radiation images (generating image unevenness, for example).

The present invention has been conceived in view of the above-described problems and has an object of preventing the image quality of a radiation image generated by a radiation imaging apparatus even in a case where the radiation imaging apparatus in an environment where a disinfectant solution with a higher disinfection effect than conventional ones is used.

To achieve at least one of the abovementioned objects, a radiation imaging apparatus reflecting one aspect of the present invention includes:
- a radiation detector that converts an intensity of received radiation into an electrical signal; and
- a case that houses the radiation detector,
- wherein an area of the case other than a predetermined area is formed of a material having durability against a disinfectant solution that has a higher disinfection effect than ethanol.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION OF THE EMBODIMENTS

Hereinafter, embodiments of the present invention are described with reference to the drawings. However, the present invention is not limited to the illustrated examples.

<Schematic Configuration of Radiation Imaging Apparatus>

First, a schematic configuration of a radiation imaging apparatus (hereinafter referred to as an imaging apparatus 100) according to this embodiment is described.

Figure 1:
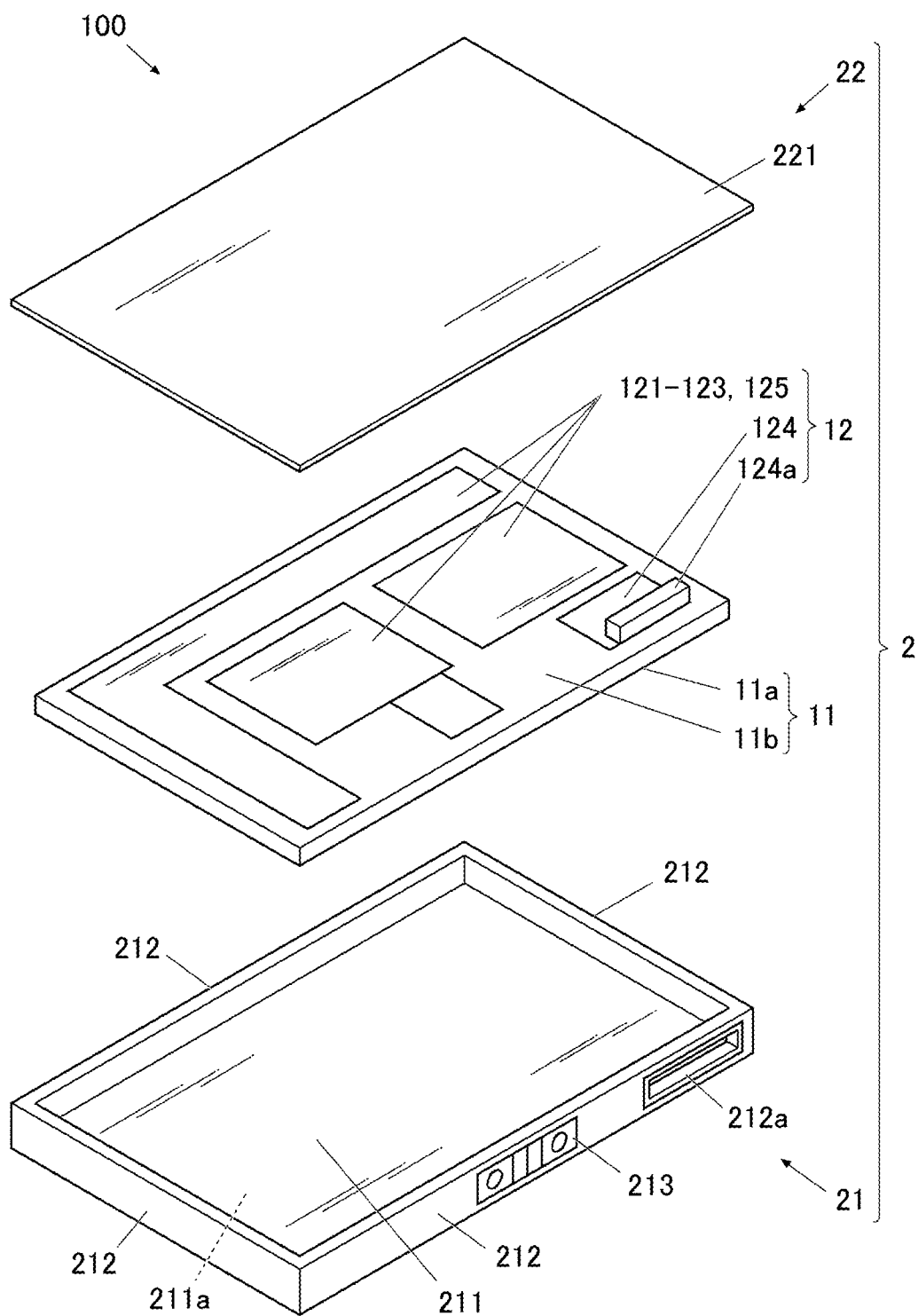
FIG. 1 shows an example of an exploded perspective view of the imaging apparatus 100 according to an embodiment of the present invention.
Figure 2:
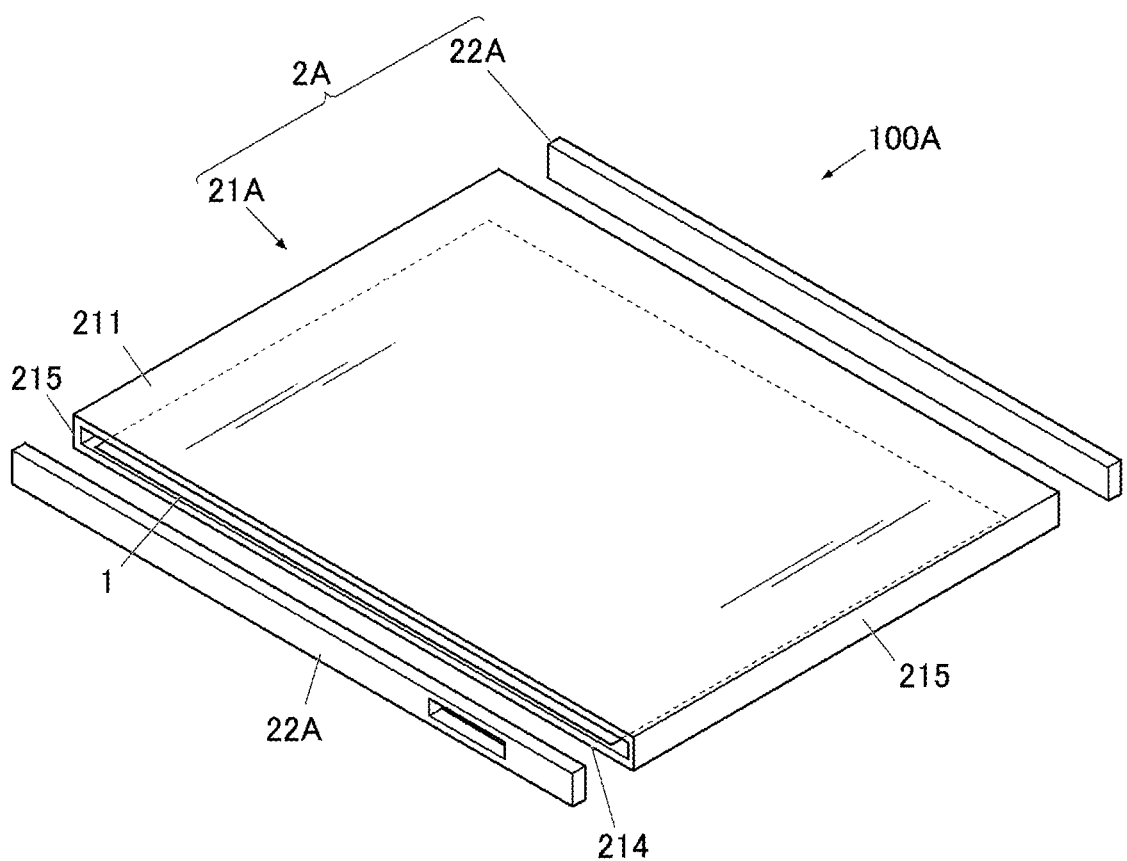
FIG. 2 shows another example of an exploded perspective view of the imaging apparatus 100 according to the embodiment.

FIG. 1 shows an example of an exploded perspective view of the imaging apparatus 100, and FIG. 2 shows another example of an exploded perspective view of the imaging apparatus 100.

The imaging apparatus 100 is for generating a radiation image according to the dose distribution of the received radiation.

The imaging apparatus 100 includes, for example, a radiation detector 1 and a case 2 as shown in FIG. 1.

[1-1. Radiation Detector]

The radiation detector 1 converts the intensity of the received radiation into an electric signal(s).

The radiation detector 1 includes a substrate 11 and electronic components 12.

[1-1-1. Substrate]

The substrate 11 includes multiple semiconductor elements (not shown).

The radiation detector 1 includes switch elements (not shown) disposed near the semiconductor elements, scan lines and signal lines (not shown) connected to the switch elements, and bias lines (not shown) connected to the semiconductor elements.

The substrate 11 according to this embodiment viewed from the front is in a shape of a rectangular plate.

The multiple semiconductor elements are formed to be distributed two-dimensionally on the surface of the substrate 11.

The semiconductor elements according to this embodiment are disposed in a matrix.

Hereinafter, a face of the substrate 11 on which the semiconductor elements are formed is referred to as an elements-formed face 11a.

[1-1-2. Electronic Components]

The electronic components 12 is electrically connected to the substrate 11.

The electronic components 12 includes a power supply circuit 121 for applying voltage to the semiconductor elements, a scanning circuit 122 for controlling the switch elements, a readout circuit 123 for reading out electric charges as image data, a communication circuit 124 for outputting image data to another device, a control circuit 125 for controlling these circuits 121 to 124, and wiring (not shown).

The circuits 121 to 125 are disposed on the face opposite to the elements-formed face 11a of the substrate 11.

Hereinafter, a face of the radiation detector 1 opposite to the elements-formed face 11a is referred to as a components-mounted face 11b.

The wiring (not shown) is composed of a flexible printed circuits, for example, and connects the terminals of the scan lines, the signal lines, and the bias lines on the elements-formed face 11a to the circuits 121 to 125 on the components-mounted face 11b.

[The Communication Circuit 124 Includes a Connection Part 124a.

The connection part 124a is connected to other device(s) (ex., a radiation generating device, a console, etc.) and is composed of connector(s) to which an end of the cable (plug) extending from the other device(s).

The connection part 124a according to this embodiment is disposed on a peripheral part of the components-mounted face 11b, facing an opening 212a formed on a side-face part 212 of a case 2 described later.

The connection part 124a according to this embodiment is in a shape bumped inward (not protruding from the surface of the case 2). That is, the connection part 124a is in a structure that prevents a cloth for cleaning the case 2 from touching it.

The connection part may be disposed on the case 2 and electrically connected to the radiation detector 1.

[1-2. Case]

The case 2 houses the radiation detector 1.

The case 2 according to this embodiment is in a shape of a rectangular panel.

The case 2 includes a box 21 and a lid 22.

[1-2-1. Box]

The box 21 includes a front part 211.

The box 21 according to this embodiment further includes the side-face part 212 and an operation interface 213.

The front part 211 and the side-face part 212 according to this embodiment are integrally formed.

The front-face part 211 and the side-face part 212 may be separate members.

(Front-Face Part)

The front-face part 211 is formed extending parallel to the elements-formed face 11a of the substrate 11.

The front-side face 211 according to this embodiment is formed in a shape of a rectangular flat plate.

The outer surface of the front-side face 211 is a radiation incident face 211a (front face) of the imaging apparatus 100 (the case 2).

(Side-Face Part)

The side-face part 212 extends from the peripheral part of the front-face part 211 in a direction separating from the front-face part 211 and perpendicular to the radiation incident face 211a.

The outer surface of the side-face part 212 is a side face of the imaging apparatus 100 (the case 2).

The opening 212a that exposes the connection part 124a to an area facing the connection part 124a of the radiation detector 1 is formed on the side-face part 212 according to this embodiment.

(Operation Interface)

The operation interface 213 can be operated by a user.

The operation interface 213 according to this embodiment includes a power switch, operation buttons, and indicators.

The operation interface 213 is electrically connected to the radiation detector 1.

The operation interface 213 according to this embodiment is part of the side-face part 212.

The operation interface may be disposed at the peripheral part of the components-mounted face of the radiation detector 1. In that case, an area facing an operation interface on the side-face part 212 (the area where the operation interface 213 is disposed according to this embodiment) may be an opening that exposes the operation interface.

[1-2-2. Lid]

The lid 22 includes a back-face part 221.

The lid 22 according to this embodiment is the back-face part 221 as a whole.

The back-face part 221 according to this embodiment is formed in a shape substantially the same with the front-face part 211.

The back-face part 221 is formed facing the front-face part 211 of the box 21 with the radiation detector 1 in between and extending parallel to the front-face part 211.

Therefore, the outer surface of the back-face part 221 is a back surface of the imaging apparatus 100 (the box 2).

The back-face part 221 is in contact with the side-face part 212 of the box 21 and attached to the side-face part 212.

The lid 22 according to this embodiment is screwed to the side-face part 212 of the box 21.

[1-2-3. Durability of Case]

The area other than the predetermined area of the case 2 configured as described are formed of a material with durability against disinfectant solutions.

The predetermined area according to this embodiment is at least one of the area where the operation interface 213 is installed and the area where the connection part 124a is exposed (the area where the opening 212a is formed).

The predetermined area occupies about two percent of the surface of the imaging apparatus 100.

That means that 98 percent or more of the surface of the imaging apparatus 100 has durability against disinfectant solutions.

The case 2 according to this embodiment including the predetermined area is formed of a material having durability against disinfectant solutions.

Material compositions of a disinfectant solution(s) to be used and the durability against the disinfectant solution are described later.

[1-2-4. Case and Others]

In FIG. 1, the case 2 (the box 21) with the side-face part 212 integrally formed with the front-face part 211 is shown as an example. However, as for the case 2, the side-face part 212 may be integrally formed with the back-face part 221, or the front-face part 211, the side-face part 212, and the back-face part 221 may be separately provided members.

Both the front-face part 211 and the back-face part 221 may have respective side-face parts in the case 2.

In FIG. 1, the case 2 with the box 21 and the lid 22 is shown as an example. However, like a radiation imaging apparatus 100A as shown in FIG. 2, the case 21 may be substituted by a case 2A that is provided with a extruded rectangular shape member 21A with: the front-face part 211; the back-face part 214; and a pair of side-face parts 215 that respectively connect the both ends of the front-face part 211 to the both ends of the back-face part 214, and a pair of lids 22A that close the openings of the extruded rectangular shape member 21A.

<2. Material Compositions>

Next, material compositions of the above-described case 2 are described.

Figure 3A:
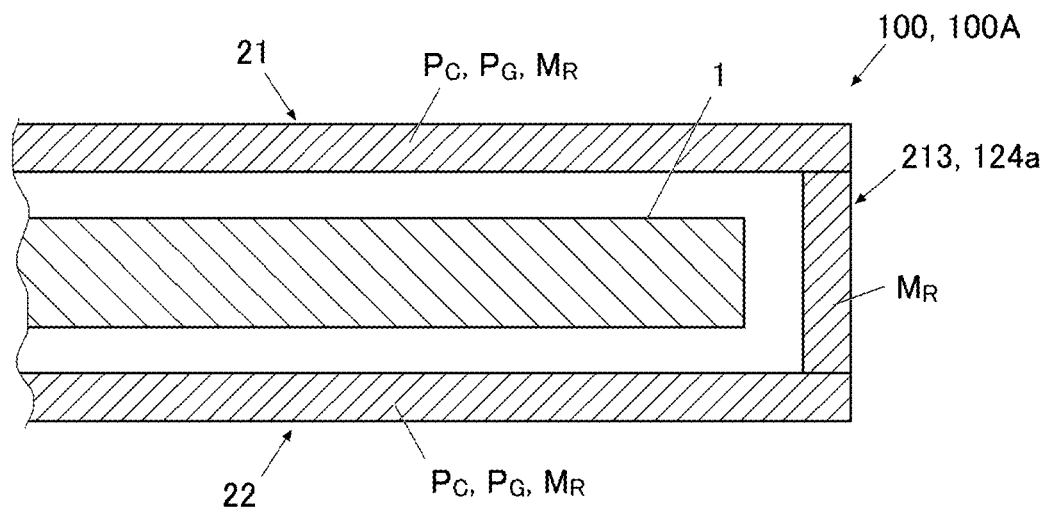
FIG. 3A shows an example of a sectional view of the radiation imaging apparatus according to the embodiment.
Figure 3B:
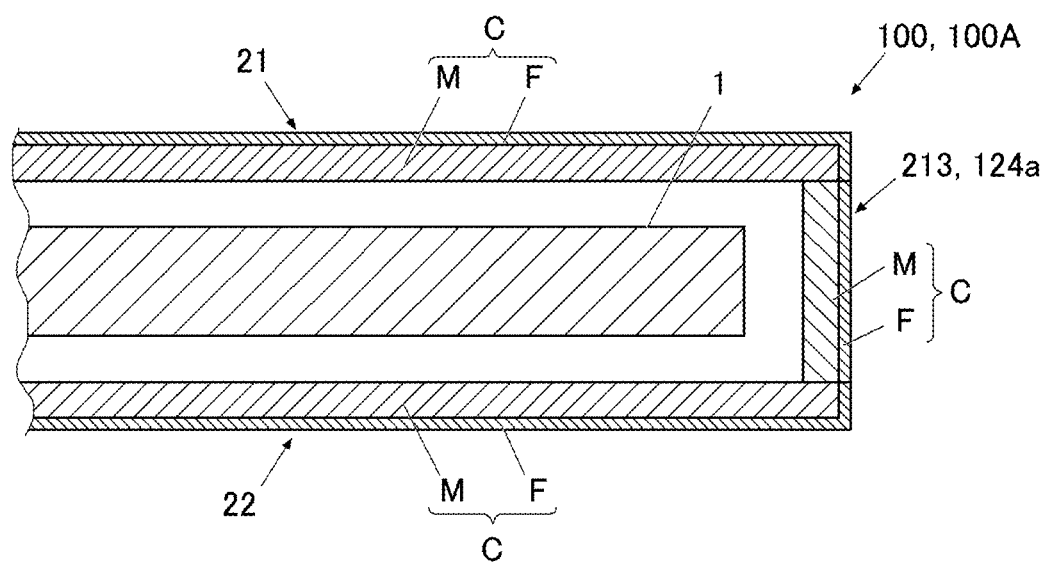
FIG. 3B shows another example of a sectional view the radiation imaging apparatus according to the embodiment.

FIGS. 3A and 3B show examples of a sectional view of the imaging apparatus 100.

At least one of the operation interface 213 and the connection part 124a that form the predetermined area of the case 2, and the box 21 and the lid 22 that form the case 2 have material compositions described below.

[2-1. Predetermined Area]

At least one of the operation interface 213 and the connection part 124a according to this embodiment is formed of a material with durability against disinfectant solutions.

The disinfectant solutions here have a higher disinfectant effect than ethanol for disinfection, and does not corrode resin but corrode metal (except for corrosion-resistant metals with durability against disinfectant solutions).

Sodium hypochlorite is an example of such disinfectant solutions.

Sodium hypochlorite is effective against bacterial spores and non-enveloped viruses like norovirus which are difficult to be disinfected with ethanol for disinfection, and has a higher disinfectant effect than ethanol for disinfection.

The operation interface 213 and the connection part 124a need to have a strength for receiving user operations and resisting external shocks and have an electrical connection to a ground for preventing noises. Therefore, at least one of the operation interface 213 and the connection part 124a according to this embodiment is formed of a material including metal in some cases.

Materials including metal may be, for example, a corrosion-resistant metal $M_R$, a composite material C, or the like.

The corrosion-resistant metal $M_R$ may be, for example, stainless steel.

The corrosion-resistant metal $M_R$ of the box 21 exists not only on the surface of the box 21 but also on the inside of the box 21 in the thickness direction (ex., all over as shown in FIG. 3A).

The composite material C may include, for example, a metal M and a protective film F that is formed of a material with durability against disinfectant solutions and that covers the surface of the metal M. That is, the composite material C is formed of a material with durability against disinfectant solutions at least on the surface.

The metal M in the composite material C may be the corrosion-resistant metal $M_R$ or a metal that corrodes with disinfectant solutions.

The protective film F includes a resin and a thin film of the corrosion-resistant metal $M_R$.

The thin film may be formed by plating, vapor deposition, or the like, or may be formed as a sheet and attached on the surface.

In FIG. 3A, the entire case 2 is formed of one material through the inside in the thickness direction, and in FIG. 3B, the entire case 2 is formed of the composite material C. However, the case 2 may be configured as follows, for example: the predetermined area is formed of one material through the inside in the thickness direction and the other area is formed of the composite material C; or the predetermined area is formed of the composite material C and the other area is formed of one material through the inside.

At least one of the operation interface 213 and the connection part 124a excluding the terminals may be formed of a resin or a material including resin.

[2-2. Materials of Box]

As for the box 21 according to this embodiment, the area other than where the operation interface 213 is installed and the area where the connection part 124a is exposed are formed of a material with durability against disinfectant solutions.

At least the front-face part 211 of the box 21 is formed of a material that does not interfere with radiation transmission.

The material that has durability against disinfectant solutions and that does not interfere with radiation transmission includes a material including resin and a material including metal described above.

The material including resin includes, for example, carbon fiber reinforced plastics (CFRP) Pc and glass fiber reinforced plastics (GFRP) PG.

The Pc or PG including resin of the box 21 exists not only on the surface of the box 21 but also on the inside of the box 21 in the thickness direction (ex. all over as shown in FIG. 3A), similarly to the box 21 formed of the corrosion-resistant metal $M_R$.

[2-3. Materials of Lid]

The lid 22 (the back-face part 221) according to this embodiment is entirely formed of a material having durability against disinfectant solutions.

The material that forms the lid 22 includes the above-described carbon fiber reinforced plastics, the above-described glass fiber reinforced plastics, the above-described corrosion-resistant metal, and the above-described composite material.

The lid 22 may be formed of the same material as the box 21 or formed of a different material.

In the case where the lid 22 is formed of a material including resin, it is preferable to use the material with fibers cut short (not in a form of a sheet or long strings). This makes it possible to easily form a recessed part for the user's fingers or a screw hole for fixing the lid 22 to the box 21.

<3. Advantageous Effects>

The imaging apparatus 100 described hereinbefore includes the radiation detector 1 and the case 2, and the area of the case 2 other than the predetermined area (at least one of the area where the operation interface 213 is installed or the area where the connection part 124a is exposed) is formed of a material (carbon fiber reinforced plastics, glass fiber reinforced plastics, corrosion-resistant metal, composite material, etc.) having durability against disinfectant solutions.

Since the case 2 formed of such a material does not corrode even if it is wiped using a disinfectant solution with a higher disinfection effect than that of conventional ones such as sodium hypochlorite, the problem of breaking of continuity between the case 2 and the radiation detector 1 does not arise, for example.

Therefore, according to the present invention, even if the imaging apparatus 100 is used under the circumstance where the apparatus is disinfected using a disinfectant solution with a higher disinfection effect than before, the image quality of radiation images generated by the imaging apparatus 100 is not deteriorated.

In particular, when the material having durability against disinfectant solutions is carbon fiber reinforced plastics, glass fiber reinforced plastics, corrosion-resistant metals, or the like, not only the surface but also the area other than the surface (the inside) has durability against disinfectant solutions. Therefore, it is possible to prevent the case 2 from corroding from the inside due to disinfectant solutions entering the case 2 through fine pores on the surface.

What is claimed is:

1. A radiation imaging apparatus comprising:
a radiation detector that converts an intensity of received radiation into an electrical signal;
a case that houses the radiation detector; and
one or more electronic components disposed in the case and operably connected to the radiation detector, the one or more electronic components including one or more of a scanning circuit and a readout circuit for reading out electric charge as image data,
wherein an area of the case other than a predetermined area is formed of a material having durability against a disinfectant solution that has a higher disinfection effect than ethanol; and
wherein the predetermined area of the case includes a first portion where an operation interface that is operable by a user is installed, the operation interface including one or more of a power switch and one or more indicators.

2. The radiation imaging apparatus according to claim 1,
wherein the predetermined area of the case comprises metal,
wherein at least a surface of the predetermined area of the case has the durability against the disinfectant solution.

3. The radiation imaging apparatus according to claim 2,
wherein the predetermined area of the case is formed of a corrosion-resistant metal having the durability against the disinfectant solution.

4. The radiation imaging apparatus according to claim 3,
wherein the predetermined area of the case includes a second portion where a connector to which a component of a device is connected is exposed.

5. The radiation imaging apparatus according to claim 2,
wherein the predetermined area of the case is formed of metal and a protective film that has the durability against the disinfectant solution and that covers a surface of the metal.

6. The radiation imaging apparatus according to claim 5,
wherein the predetermined area of the case includes a second portion where a connector to which a component of a device is connected is exposed.

7. The radiation imaging apparatus according to claim 2,
wherein the predetermined area of the case includes a second portion where a connector to which a component of a device is connected is exposed.

8. The radiation imaging apparatus according to claim 1,
wherein the predetermined area of the case is at least one of a first portion where an operation interface that is operable by a user is installed and includes a second portion where a connector to which a component of a device is connected is exposed.

* * * * *